May 18, 1943.  R. J. PARSONS  2,319,704
HEATING
Filed June 7, 1940  2 Sheets-Sheet 1
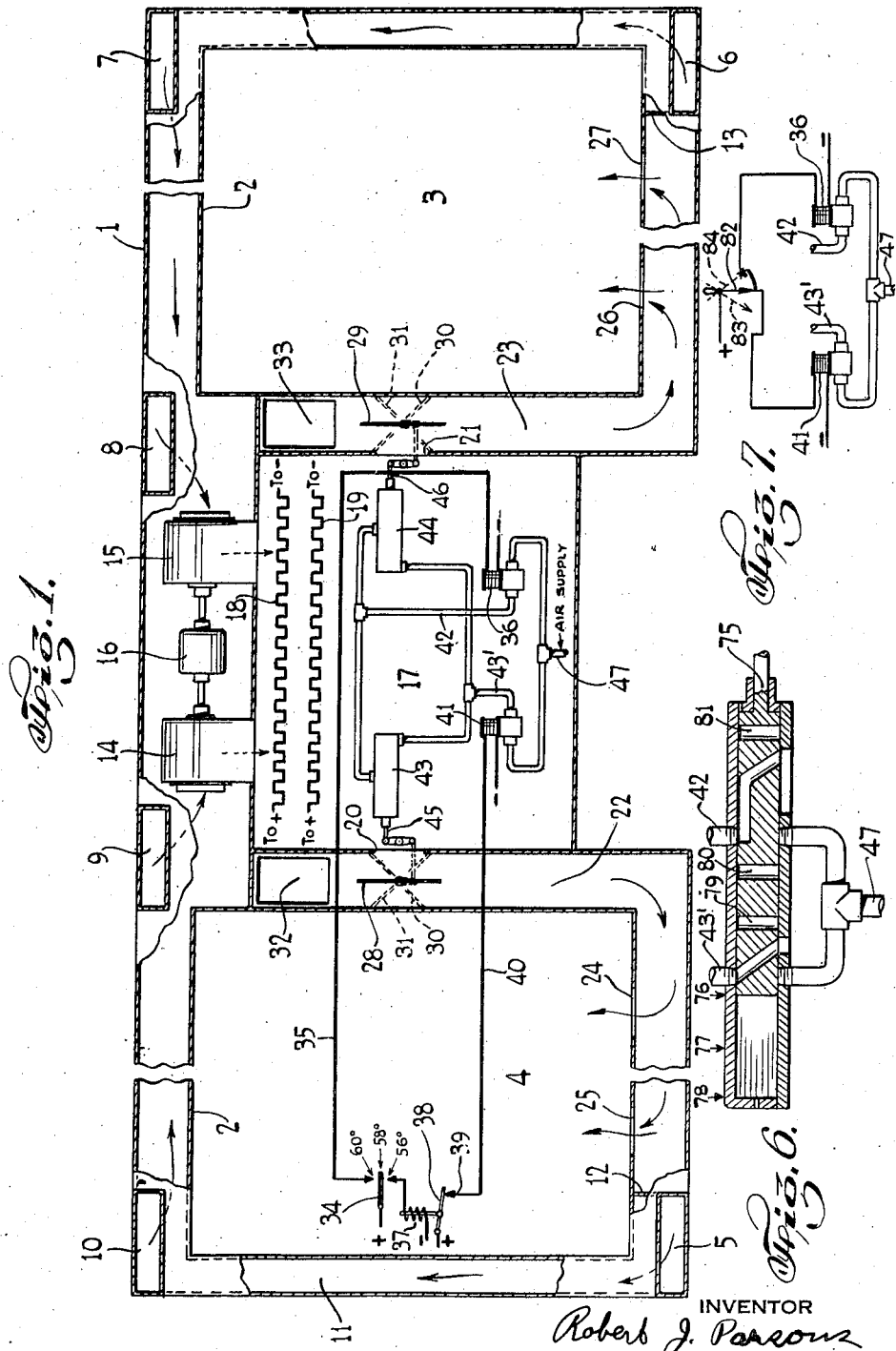
INVENTOR
Robert J. Parsons
BY
Lyman E. Dodge
ATTORNEY

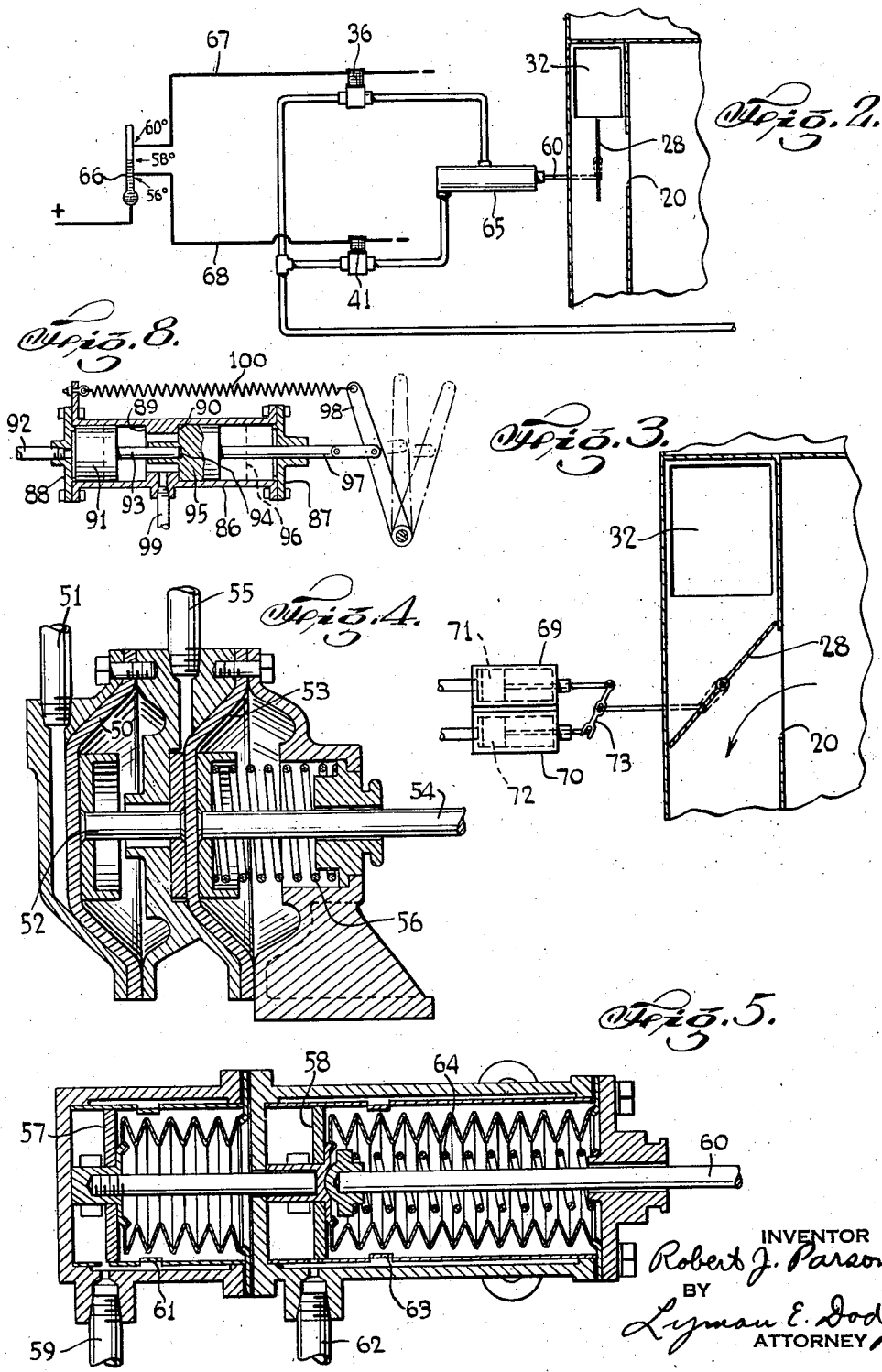

Patented May 18, 1943

2,319,704

UNITED STATES PATENT OFFICE 2,319,704

HEATING

Robert J. Parsons, Schenectady, N. Y., assignor to Consolidated Car Heating Company, Inc., Albany, N. Y., a corporation of New York Application June 7, 1940, Serial No. 339,318

1 Claim. (Cl. 236—84)

This invention relates to heating, especially to heating a space in which human beings may be, and more especially to heating of the passenger occupied space of a vehicle.

In my prior Patent No. 1,993,521, I have shown, described and claimed a desirable arrangement of mechanism including electrical devices, by which the interior of a vehicle may be suitably heated. In that patent I have illustrated certain dampers, one of which is electrically operated. This damper which is electrically operated as shown in my prior patent governs the amount of heated air which is forced into the passenger occupied space of the vehicle. In the arrangement of my prior patent the damper is either wholly open or wholly closed. This is efficacious in many instances but in other instances it is unsatisfactory. At least, it does not afford the desired gradation of volume of heated air forced into the car body which is in some cases desired.

A principal object of the present invention is to provide an arrangement whereby a damper controlling the admission of hot air to the passenger space of a vehicle may be adjusted to give a closer approximation to the desired volume of hot air required than is afforded by the arrangement of my prior patent.

I realize that the ideally perfect system would be provided by an arrangement of damper adjustment whereby hot air is admitted to the passenger space of a vehicle in exact accordance with the momentary temperature in that space. Such an arrangement, however, being practically a floating damper would be extremely difficult to keep in adjustment.

A further object of this invention is what may be called a compromise, in that, although the arrangement does not provide the ideally perfect equipment, it does provide an arrangement whereby the volume of hot air which is admitted to the passenger compartment of a vehicle may be cut off entirely or allowed to flow in full volume or in diminished volume, that is, I provide for a mid-position of a damper between the full open and full closed positions.

Other objects and advantages will appear as the description of the particular physical embodiment selected to illustrate the invention progresses, and the novel features will be particularly pointed out in the appended claim.

In describing the invention in detail and the particular physical embodiment selected to illustrate the invention, reference will be had to the accompanying drawings and the several views thereon, in which like characters of reference designate like parts throughout the several views and in which:

Figure 1 is a somewhat schematic, approximately plan view of the body of a passenger vehicle with my invention applied thereto; Fig. 2 is a fragmentary view of an alternative arrangement of my invention; Fig. 3 is a further alternative arrangement for my invention; Fig. 4 is a cross-sectional view of a diaphragm operated motor usable in connection with my invention; Fig. 5 is a cross-sectional view of a double cylinder piston motor which may be used in connection with my invention; Fig. 6 is a schematic view of a three position air valve with connecting pipes; Fig. 7 is a fragmentary view illustrating a manual means for operating a device of the invention; Fig. 8 is a cross-sectional view similar to Fig. 5 showing a modified form of a double cylinder piston motor which may be used in connection with my invention.

In Figure 1, numeral 1 designates the outside wall of a passenger vehicle and 2 designates the inside wall thereof.

As arranged as shown in Fig. 1, spaces 3 and 4 are passenger containing spaces and really represent the interior of a passenger vehicle. At 5, 6, 7, 8, 9 and 10 there are conduits connecting at the upper end with the atmosphere and passenger spaces 3 and 4 and at the lower end with a duct 11 which is continuous from the wall 12 around in a clockwise direction to the wall 13. The ducts 5 to 10 inclusive allow air from the atmosphere and the air in the upper part of the compartments 3 and 4 to flow down into duct 11 and so to the blowers 14 and 15 operated by the motor 16, the motor being supplied with current in any desired way.

The air forced from the blowers 14 and 15 enters the compartment 17 and passes over electrical resistance elements 18 and 19. These electrical resistance units 18 and 19 may have current caused to flow therethrough cooperatively or independently or in any other desired manner and be controlled as desired, as in my prior patent.

The air blown into the compartment or chamber 17 can flow out through the duct ports 20 and 21 and is led by the ducts 22 and 23 respectively to the openings 24 and 25 and 26 and 27 opening into the passenger spaces 3 and 4.

By the arrangement hereinbefore described, it will be seen that the air taken from the passenger spaces 3 and 4 flows down through the ducts 5 to 10 inclusive, arrives in the duct 11, flows to the blowers 14 and 15 and from thence is forced into the chamber 17 and from thence goes from the ducts 22 and 23 to the openings 24 to 27 inclusive and into the passenger spaces 3 and 4 to heat the same.

As will be more fully understood by reference to my prior Patent 1,993,921, it may well occur that the air circulating as described may be too hot as there are various and sundry reasons why the regulation of resistance heat units 18 and 19 would not be so governed that this would not occur. In consequence of this, it has been found desirable and necessary to arrange for varying the volume of air supplied to the passenger spaces 3 and 4.

In the drawings, as shown by Fig. 1, this variation in volume is secured by means of pivoted dampers 28 and 29. These dampers when swung into the dotted line position, as shown by 30, allow all of the air to flow into the duct 23 and so into the passenger space but if the dampers are swung to the position as shown in dotted line by 31, then all of the air delivered to chamber 17 will be forced out through the duct openings 32 and 33 to atmosphere. If the dampers 28 and 29 are in full line position as shown in Fig. 1, then substantially one half of the volume of hot air from chamber 17 will flow into the ducts 22 and 23 and one half out to atmosphere through duct openings 32 and 33.

By arranging the dampers so that they may be moved to be in any one of three positions the temperature regulation of the passenger space of the vehicle is greatly facilitated and the temperature may be maintained substantially within two and one half or three degrees each way from a predetermined fixed temperature. In the specific illustration used, I have assumed 58 degrees F. as the fixed temperature and indicated that a damper change is caused when the temperature drops to 56 degrees or rises to 60 degrees as shown by the thermostat in the left hand portion of Fig. 1 which has been designated 34 and may be assumed to be an ordinary conventional bi-metallic thermostatic element which bends toward the 56 degree point when the temperature falls and toward the 60 degree point when the temperature rises in the passenger space.

In order to operate the dampers 28 and 29 in accordance with variations of the thermostatic element 34 I connect the thermostatic element 34 to the positive terminal of a source of electromotive force. I also have the thermostatic element 34 electrically contact the electrical conducting point indicated as 60 degrees when the temperature in the car space rises so that current may then flow over the wire 35 to the valve 36. I also arange the electrical conducting point indicated as 56 degrees so that when the thermostatic element 34 connects thereto current will flow through the relay coil 37 to the negative terminal of the source of electromotive force and so raise the armature 38 to break contact with the back point 39 which is connected by wire 40 to valve 41.

Valves 36 and 41 are both made identical and are of the ordinary and conventional form of electromagnetic air valve and operate when energized to allow air from a source of compressed air to flow through the valve and in the one case to pipe 42 and in the other case to the pipe 43', and to exhaust these pipes when de-energized.

When both valves 36 and 41 are deenergized which corresponds with a condition in which thermostatic element 34 contacts with temperature point 56 degrees both of the dampers 28 and 29 are in the fully closed position as shown by the dotted line position of damper 29, so that all of the hot air is delivered to ducts 22 and 23 and so to the ports 25 to 27 inclusive and to the passenger space 3 and 4.

When thermostatic element 34 rises to the middle position, as shown by Fig. 1, so that it contacts neither the point designated 56 degrees nor the point designated 60 degrees then the armature 38 due to the deenergization of relay 37 falls upon the back point 39 and current flows from the positive terminal of the source of electromotive force through the armature 38 or 39, wire 40 and valve 41 to the negative terminal of the source of electromotive force. The energization of this valve 41 allows compressed air to flow from the air supply through the pipe 43' to both of the cylinders 43 and 44 and cause the piston rods 45 and 46 to assume the mid position in which the dampers 28 and 29 are moved to the full line position as shown in Fig. 1 so that one half of the volume of air from space 17 is delivered to the ducts 22 and 23 and the other half to the ports 32 and 33 opening to the atmosphere.

If the thermostatic element 34 continues and moves into contact with the point designated 60 degrees then current will flow from the positive terminal of the source of electromotive force and then through 34 and the wire 35 and the valve 36 and thence to the negative terminal of the source of potential. The energization of valve 36 will allow compressed air to flow into pipe 42 and so into both cylinders 43 and 44 and force the piston rods 45 and 46 to the extreme position in which both dampers 28 and 29 are moved to the dotted line position of damper 31 whereby the entire volume of air delivered to chamber 17 passes into the port openings 32 and 33 to the atmosphere.

If while the dampers 28 and 29 are in the fully open position as shown by the dotted line position of damper 30 the thermostatic element 34 moves from in contact with the point designated 60 degrees to the 58 degrees position then the valve 36 will be deenergized and the compressed air will not be supplied to the pipe 42 but will exhaust therefrom and from the cylinders 43 and 44 to the extent that the piston rods 45 and 46 will return to the mid position longitudinally and bring the dampers back to the full line position as shown in the figure. If thereafter the thermostatic element 34 moves in contact with the point designated 56 degrees air valve 41 will be deenergized and air pressure cut off from pipe 43 and so from cylinders 43 and 44 so that the rods 45 and 46 will assume the position in which both dampers 28 and 29 are in the fully closed position as shown by the dotted line position 30 of the damper.

The air valves 36 and 41 are of the ordinary and conventional type which allow air pressure to pass therethrough upon energization from the air supply 47 and upon deenergization cut off the passage of air therethrough and allow exhaust from pipes 42 and 43 to which the air had been previously supplied.

The operating motor for the dampers of which the cylinders have been designated 43 and 44 may be of various types. One type has been illustrated in Fig. 4. In Fig. 4 there is a flexible diaphragm 50. If air is supplied to pipe 51 flexible diaphragm will move toward the right as viewed in Fig. 4 and thereby force rod 52 to the right and bearing against diaphragm 53 will force it and rod 54 to the right so that the rod 54 although now in what is designated as one extreme position will be thereby moved to an intermediate position. If air is then thereafter allowed to flow into pipe 55 it will force diaphragm 53 still farther to the right without effecting rod 52 which merely bears thereagainst and the rod 54 will thereby be moved to what I designate the other extreme position thereof. From this, it will be seen that the rod 54 has three positions, to wit, the one shown in Fig. 1, the intermediate position caused solely by diaphragm 50; and another extreme position caused by a further movement of diaphragm 53, and a third in which the diaphragms, are both to the left as viewed in Fig. 4.

When the air is exhausted from either pipe 51 or 53 or by the deenergization of the valves such as 36 and 41 any suitable means may be used to return the rod 54 to a proper position. In Fig. 4 I have shown the helical spring 56 as a suitable means for so doing.

In Fig. 5 I have shown another form of air operated motor for moving the dampers 28 and 29. In this form of motor there are two pistons 57 and 58. When air is admitted to pipe 59 piston 57 moves to the right, as viewed in Fig. 5 and forces piston 58 to the right and so rod 60 which corresponds with the operating rods 45 and 46 of Fig. 1. The limit of this movement is the stop 61. If air is then admitted to pipe 62 the piston 58 will move still farther to the right until it contacts stop 63 and then rod 60 will be in its extreme outer position. When air is exhausted from pipe 62 the helical spring 64 returns the piston 58 to its original position as shown in Fig. 5 and then when air is exhausted from pipe 59 the piston 57 is also returned to its original position.

In Fig. 2 an alternative method is shown in which the air valves 36 and 41 operate upon the air supply line to admit compressed air to the cylinder 65 which operates the damper 29 but these air valves are controlled by a mercury thermostatic switch in which there is a column of mercury designated 66 that forms a connection between the positive terminal of the source of electromotive force and the wires 67 and 68 connected with the electromagnetic air valves 36 and 41.

In Fig. 3 I have illustrated another arrangement in which there are two cylinders 69 and 70 to which compressed air is supplied in any suitable or appropriate manner as by electromagnets 36 and 41. When the pistons 71 and 72 are both at the extreme left hand position, damper 28 is in the fully closed position, but when air is admitted to cylinder 70 the damper 28 assumes the mid position and then when air is admitted to cylinder 69 the damper assumes the fully open position. This is accomplished by means of floating lever 73.

In Fig. 6 there has been illustrated in a diagrammatic and fragmentary manner, merely for the purpose of illustration, a manually operable air valve. This air valve is to illustrate the fact that, although the dampers may be operated automatically, it is also quite feasible to operate them manually. In case it is desired to operate the dampers manually, then instead of using the thermostat and the electro magnetic valves 41 and 36, the connection between pipes 42 and 43' and the air supply 47 could be made in the manner somewhat as shown in Fig. 7 or any other appropriate or suitable three position air valve could be used.

In Fig. 6 the slide 75 may be caused by a manual movement, to assume three positions indicated by the arrows 76, 77 and 78. When the valve is in the position as shown by the arrow 76, then both pipes 42 and 43' are vented to atmosphere as shown by the ports connecting thereto. When the slide 75 is moved to the position 77 then pipe 43' is supplied with compressed air from pipe 47 through the port 79 and at the same time pipe 42 still remains vented. When the slide 75 is moved to the position indicated by 78 then pipe 43' is still supplied with compressed air through port 80 and pipe 42 is supplied with compressed air through the port 81.

Upon returning the slide same positions are assumed as before as in moving the slide to the left as viewed in Fig. 6 so that the net result is that when the slide is in position 76 both dampers 28 and 29 are in the dotted line position designated 30; when the slide 75 is in the position 77, then both dampers 28 and 29 are in the full line position; when the slide is at the position designated 78 then both dampers are in the dotted line position designated 31.

In Fig. 7 the electromagnetic air valves 41 and 36 are shown as operated by a manually operated switch 82. This switch may have three positions, when it is in the dotted line position 83; when it is in the full line position as shown in Fig. 7; and when it is in the dotted line position designated 84.

In Fig. 8 a cylinder 86 is shown having removable heads 87 and 88 and provided with a forwardly limiting shoulder 89 and a rearwardly limiting shoulder 90. A piston 91 is positioned as shown in Fig. 8 when no hydraulic fluid pressure or air pressure is applied, but when hydraulic fluid pressure or air pressure is applied through the pipe 92, the piston 91 moves forward and to the right as viewed in Fig. 8 so that it contacts the forward stop shoulder 89. In so doing the piston rod 93 thereof positioned in a cavity 94 of piston 95 forces piston 95 forward so that its front or right hand end, as viewed in Fig. 8, coincides with the dotted line 96 thereby forcing the piston rod 97 to the right as viewed in Fig. 8 and thereby moves the crank 98 to the middle dotted line position as shown in Fig. 8. If thereafter hydraulic fluid pressure or air pressure is applied through the pipe 99 the piston 91 will remain in its then position as fluid pressure is being applied to one side of it through the pipe 92 but the piston 95 will be moved farther to the right as viewed in Fig. 8 so that its right hand face will contact the right hand end cap of the cylinder whereupon the crank 98 will be moved to the extreme right in dash and dot line position as shown in Fig. 8.

The several positions of crank 98 correspond with the several positions of the somewhat corresponding cranks attached to the ends of piston rods 44 and 46 of Fig. 1 and the piston rod 60 of Fig. 2.

When hydraulic fluid pressure is allowed to exhaust from pipe 99, the first movement is for crank 98 to move to the intermediate dash dot line position of Fig. 8 and upon a subsequent release of hydraulic fluid pressure from pipe 92 the crank returns to the full line position of Fig. 8 being in each case drawn thereto by means of the retractal spring 100.

When the manually operable switch is in the dotted line position 83 the conditions simulate the conditions when the thermostat is in contact with the 56 degree position and both dampers are in the dotted line position as designated by 30. When the manually operable switch is in the 82 position it corresponds to the conditions as indicated in Fig. 1 with the thermostat in the mid position so that only electromagnetic air valve 41 is energized and the dampers are in the mid or full line position; when the manually operable switch is in the 84 position both electromagnets 41 and 36 are energized and the dampers are in the dotted line position designated 31.

Although I have particularly described particular physical embodiments of my invention and explained the operation, construction and principle thereof, nevertheless, I desire to have it understood that the forms selected are merely illustrative, but do not exhaust the possible physical embodiments of the idea of means underlying my invention.

What I claim as new and desire to secure by Letters Patent of the United States, is:

In a heating system, in combinaiton: a thermostat having two extreme positions and an intermediate position; two electromagnetic air valves; a relay including an armature; means whereby when the thermostatic element is in one extreme position one of the air valves is energized electrically, and means whereby when the thermostatic element is in the other extreme position the said relay is energized, its armature raised and the other electromagnetic air valve is deenergized and whereby when the thermostatic element is in the intermediate position the said relay is de-energized, its armature lowered and the said last named electromagnetic air valve is energized; and a damper operating motor controlled by said air valves.

ROBERT J. PARSONS.